No. 781,138. PATENTED JAN. 31, 1905.
H. H. G. ETCHEVERRY.
ECONOMICAL ENDLESS BAND CONVEYER.
APPLICATION FILED SEPT. 16, 1903.
2 SHEETS—SHEET 1.
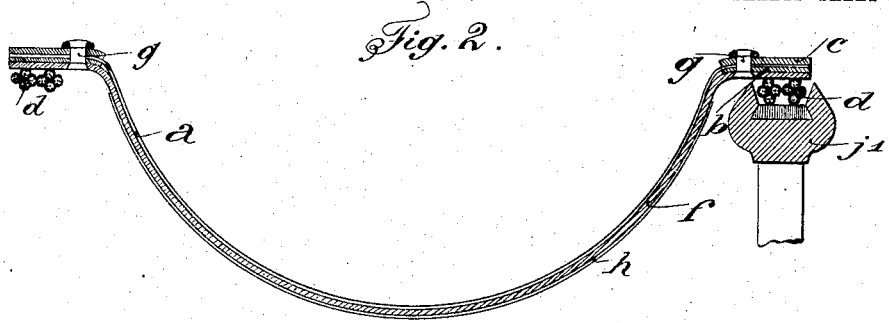
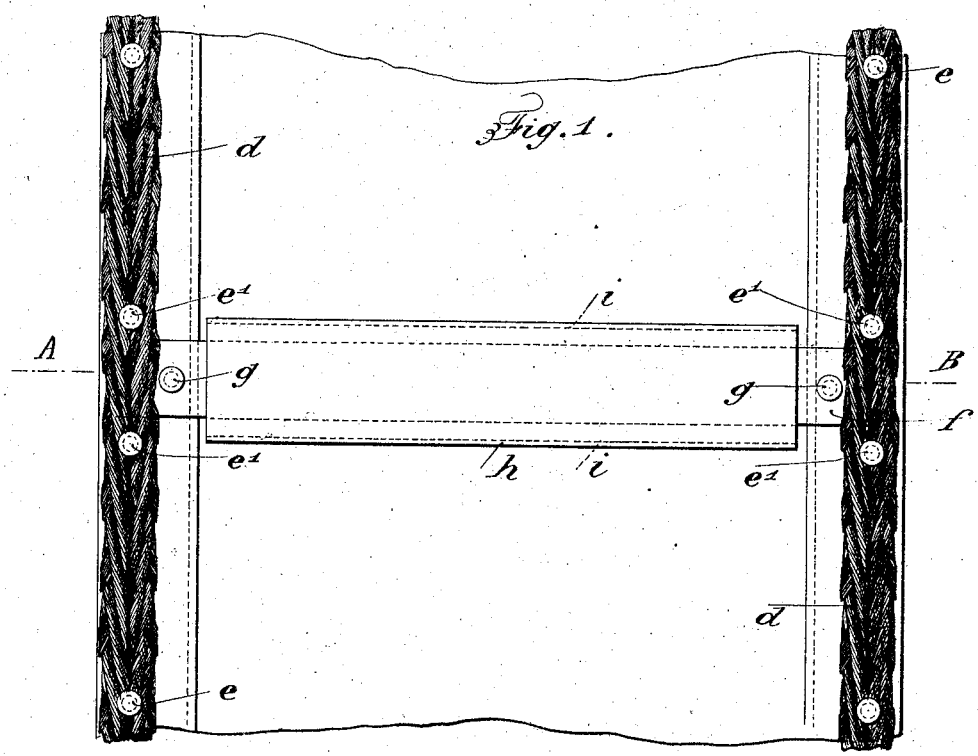
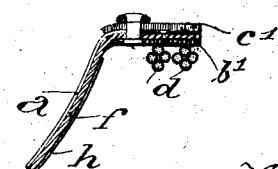

No. 781,138. PATENTED JAN. 31, 1905.
H. H. G. ETCHEVERRY.
ECONOMICAL ENDLESS BAND CONVEYER.
APPLICATION FILED SEPT. 16, 1903.

2 SHEETS—SHEET 2.

No. 781,138.                                              Patented January 31, 1904.

UNITED STATES PATENT OFFICE.

HUGUES HENRI GEORGES ETCHEVERRY, OF PARIS, FRANCE.

ECONOMICAL ENDLESS-BAND CONVEYER.

SPECIFICATION forming part of Letters Patent No. 781,138, dated January 31, 1905.

Application filed September 16, 1903. Serial No. 173,439.

*To all whom it may concern:*

Be it known that I, HUGUES HENRI GEORGES ETCHEVERRY, engineer, of Paris, France, have invented certain new and useful Improvements in Economical Endless-Band Conveyers, of which the following is a full, clear, and exact description.

The present invention relates to endless-band conveyers which at all times preserve their trough-shaped cross-section, so that any material can be conveyed by the belt in a horizontal direction or on inclines up to forty-five degrees.

The conveyer consists of an endless cloth having reinforced edges secured to parallel and endless carrying-cables, which may be of a round, square, or flat cross-section. Stays or braces curved in correspondence with the mold-shaped cross-section of the cloth are secured, with their ends to the reinforced edges, respectively, to the cables, serving to keep the cables at equal distance from each other, so that they run at all times parallel. The cables are guided over pulleys in the ordinary manner, which are coupled to each other in pairs by a differential gear, so that the pulleys can adapt themselves to any unevenness of the cloth conveyer.

Figure 4:
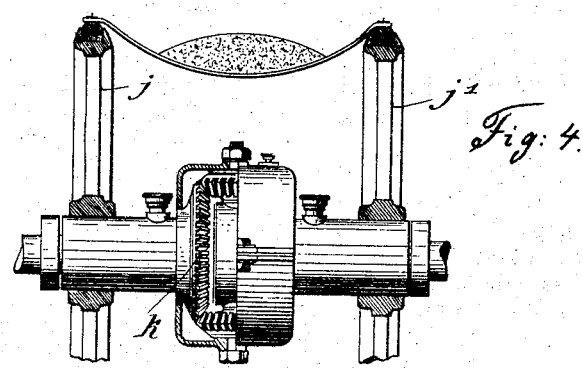
Figure 5:
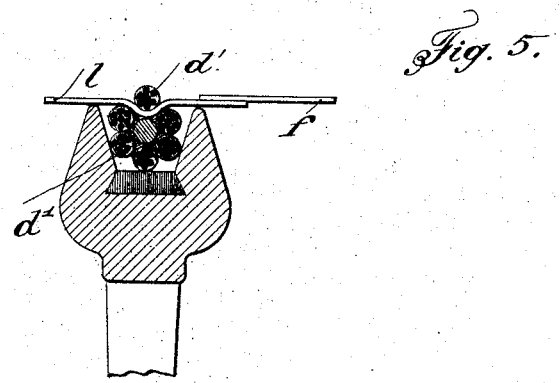
Figure 6:
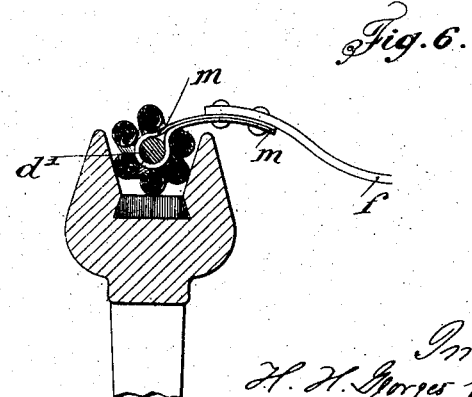

In the accompanying drawings, forming part of this specification, Figure 1 shows a portion of the conveyer seen from below. Fig. 2 is a cross-section on line A B, Fig. 1. Fig. 3 illustrates a modification showing the stays between the strengthening-strips of the reinforced edges instead of below them, as in Fig. 2. Fig. 4 is a view, partly in section, of the pulleys and the differential gear. Figs. 5 and 6 illustrate special means of securing the ends of the stays to the cables.

$a$ is a strong cloth—of cotton, for example—having both edges reinforced by strips $b$ and $c$, one on the top side, the other on the lower side. The connection may be effected by sewing, riveting, or otherwise. The reinforced edges are preferably secured to cables $d$, forming the carrying element of the conveyer and running over pulleys $j j'$, which are connected in pairs by differential gears $k$, as shown in Fig. 4. The connection may be effected in any convenient manner—as, for instance, by rivets $e\ e'$.

$f$ represents strips of galvanized steel, being curved, as shown in Fig. 2, and being secured in certain distances from each other under the cloth $a$. The ends of these stays may be bound in between the cable and the strengthening-strips $b$ and $c$, as shown in Fig. 2, or they may be run between these strips $b'\ c'$, as shown in Fig. 3. The ends are, besides, secured to said strips by rivets $g$. The stays in this way are well secured to the edges of the cloth, as well as to the carrying-cables. Another method of securing the same to the cables is illustrated by Figs. 5 and 6, and this method is preferably used for cables of round cross-section to prevent their turning. To the ends of the stays strips of soft iron, brass, or other soft metal are riveted, such as $l$ in Fig. 5, which are run through the strands of the cable, or such as $m$, Fig. 6, which are looped around the middle strand of the cable.

$h$ is a strip of cloth sewed or otherwise secured to the cloth $a$ so as to cover the main part of the stays $f$ and to protect it. The stitches uniting such strip $h$ to the cloth $a$ are indicated in Fig. 1 by dotted lines $i$.

Having thus fully described my invention, what I claim as new, and desire to secure by United States Letters Patent, is—

1. A belt conveyer, composed of an endless cloth $a$ having its longitudinal edges strengthened by strips $b$ and $c$ of cloth, canvas, leather or similar material, of parallel endless carrying-cables to which said edges are riveted, said cloth running jointly with said cables over pulleys coupled to each other in pairs by a differential gear, and of rigid curved bars or stays $f$, provided with means to secure their ends to the carrying-cable, thereby maintaining the cloth $a$ in a stretched position, substantially as described.

2. A belt conveyer, composed of an endless cloth $a$ having its longitudinal edges strengthened by strips $b$ and $c$ of cloth, canvas, leather or similar material, of parallel endless carrying-cables to which said edges are riveted, said cloth running jointly with said cables over pulleys coupled to each other in pairs by a differential gear of rigid curved bars or stays $f$ provided with means to secure their ends to the carrying-cable, thereby maintaining the cloth $a$ in a stretched position, and of a protecting-strip $h$ of cloth, canvas, leather or other suitable material, covering the bars underneath, substantially as described.

3. A belt conveyer, composed of an endless cloth $a$ having its longitudinal edges strengthened by strips $b$ and $c$ of cloth, canvas, leather or similar material, of parallel endless carrying-cables to which said edges are riveted, said cloth running jointly with said cables over pulleys coupled to each other in pairs by a differential gear, and of rigid curved bars or stays $f$, secured with their ends to the carrying-cables by means of soft-metal strips, thereby maintaining the cloth $a$ in a stretched position, substantially as described.

4. A belt conveyer, composed of an endless cloth $a$ having its longitudinal edges strengthened by strips $b$ and $c$ of cloth, canvas, leather or similar material, of parallel endless carrying-cables to which said edges are riveted, said cloth running jointly with said cables over pulleys coupled to each other in pairs by a differential gear, of rigid curved bars or stays $f$, secured with their ends to the carrying-cables by means of soft-metal strips, thereby maintaining the cloth $a$ in a stretched position, said strips being looped around the center strand of the cables, substantially as described and for the purpose as set forth.

In witness whereof I have hereunto set my hand in presence of two witnesses.

HUGUES HENRI GEORGES ETCHEVERRY.

Witnesses:
GASTON LEHMAN,
GEORGE RIGOT.